(12) United States Patent
Zheng et al.

(10) Patent No.: US 10,914,934 B2
(45) Date of Patent: Feb. 9, 2021

(54) WIDE-FIELD MULTI-SCALE HIGH-RESOLUTION MICROSCOPIC IMAGING SYSTEM AND METHOD

(71) Applicant: ZHEJIANG UNIVERSITY, Zhejiang (CN)

(72) Inventors: Zhenrong Zheng, Hangzhou (CN); Xiao Tao, Hangzhou (CN); Wentao Zhang, Hangzhou (CN); Chenning Tao, Hangzhou (CN); Haifeng Li, Hangzhou (CN); Xu Liu, Hangzhou (CN)

(73) Assignee: ZHEJIANG UNIVERSITY, Zhejiang (CN)

( * ) Notice: Subject to any disclaimer, the term of this patent is extended or adjusted under 35 U.S.C. 154(b) by 0 days.

(21) Appl. No.: 16/080,287

(22) PCT Filed: Jan. 25, 2018

(86) PCT No.: PCT/CN2018/074077
§ 371 (c)(1),
(2) Date: Aug. 27, 2018

(87) PCT Pub. No.: WO2018/157682
PCT Pub. Date: Sep. 7, 2018

(65) Prior Publication Data
US 2020/0183142 A1    Jun. 11, 2020

(30) Foreign Application Priority Data

Feb. 28, 2017 (CN) .......................... 2017 1 0114297

(51) Int. Cl.
*G02B 21/02* (2006.01)
*G02B 21/36* (2006.01)
(Continued)

(52) U.S. Cl.
CPC ....... *G02B 21/365* (2013.01); *G01N 21/6458* (2013.01); *G02B 21/02* (2013.01);
(Continued)

(58) Field of Classification Search
CPC .. G02B 9/64; G02B 13/0045; G02B 13/0095; G02B 13/22; G02B 21/00; G02B 21/02;
(Continued)

(56) References Cited

U.S. PATENT DOCUMENTS 5,076,676 A * 12/1991 Saito .................. G02B 21/02
                                                    359/656
7,539,356 B2 * 5/2009 Igari .................. G06T 3/4038
                                                    345/629
(Continued)

FOREIGN PATENT DOCUMENTS

CN    104849852 A    8/2015
CN    204666515 U    9/2015
(Continued)

*Primary Examiner* — Thong Q Nguyen
(74) *Attorney, Agent, or Firm* — Avant Law Group, LLC

(57) ABSTRACT

The invention discloses a wide-field multi-scale high-resolution microscopic imaging system, which includes a light source, a sample, a microscope imaging objective system, an acquisition system, and a workstation. The microscope imaging objective system is used for forming an image after a light beam emitted by the light source illuminates the sample. To obtain a wide-field curved image plane, the acquisition system includes an acquisition lens array for subfield acquisition of the curved image plane, and a camera array for secondary imaging. The workstation is used for analyzing the acquired image in overlapping fields of view, and performing image splicing based on the fields of view, to finally obtain a wide-field high-resolution image. Because of the desire for an improvement to an imaging method, this invention realizes multi-scale high-resolution observation (Continued)

from cells, tissues, to organs while ensuring a wide field of view.

5 Claims, 3 Drawing Sheets

(51) Int. Cl.
    *G01N 21/64*     (2006.01)
    *G02B 21/08*     (2006.01)
    *G02B 27/14*     (2006.01)

(52) U.S. Cl.
    CPC ........... *G02B 21/08* (2013.01); *G02B 21/361* (2013.01); *G02B 27/141* (2013.01)

(58) Field of Classification Search
    CPC .... G02B 21/08; G02B 21/361; G02B 21/365; G02B 27/141

USPC .......................... 359/368, 618, 626, 656–661
See application file for complete search history.

(56) References Cited

U.S. PATENT DOCUMENTS

| | | | | |
|---|---|---|---|---|
| 7,742,213 | B2* | 6/2010 | Potsaid | G02B 21/0048 |
| | | | | 359/212.1 |
| 7,848,027 | B2* | 12/2010 | Yoshida | G02B 27/0056 |
| | | | | 359/656 |
| 2007/0152130 | A1 | 7/2007 | Fomitchov | |
| 2019/0162933 | A1* | 5/2019 | Zheng | G02B 9/64 |

FOREIGN PATENT DOCUMENTS

| | | |
|---|---|---|
| CN | 105352923 A | 2/2016 |
| CN | 106707482 A | 5/2017 |

* cited by examiner

WIDE-FIELD MULTI-SCALE HIGH-RESOLUTION MICROSCOPIC IMAGING SYSTEM AND METHOD

TECHNICAL FIELD

The present invention relates to the field of optical microscopy technologies, and in particular, to a design of a wide-field multi-scale high-resolution microscopic imaging system and a method thereof.

BACKGROUND

With the development of science and technology, people are constantly pursuing an increasingly larger observation scope and increasingly higher resolving power in neuropathology, genetics, and neuroscience research.

A conventional design of an imaging instrument mainly focuses on analysis of the case in which an object plane and an image plane are planar. Generally, a sequential independent mode from an image point to an object point is used, which merely considers a mapping design from the image point to the object point. In the calculation of an optical field design, by integrating imaging relationships between an optical system, a photoelectric system and a signal processing system, the system performance is optimized jointly through the integrated design and parameter adjustment of the system. Based on the computational photography theory, the design of a satisfactory photoelectric imaging instrument is not simply a combination of high-quality lenses and large-area array detectors, but further needs to comprehensively optimize a lighting system, a lens system, a photoelectric detector and a signal processing algorithm. Such an unconventional optical imaging instrument has excellent performance, and a relationship between a physical system for image capture and a computing system for image processing in the photoelectric imaging instrument should be re-defined.

The current trend of life research is to observe small-scale details in living cells. The organism should have multi-scale features formed from sub-cells, cells, tissues, organs, to a system. The optical imaging instrument made based on computational optics requires not only the ability to accurately observe the biological characteristics of individual cells, but also the ability to assess pathophysiological processes and interactions in the complete micro-environment of the organism. It is expected to reveal the laws of important life phenomena under physiological and pathological conditions, which places stringent requirements and challenges on the development of optical observation instruments.

Therefore, it is necessary to find an imaging method that can deal with the relationship between the physical system for image capture and the computing system for image processing, so as to organically combine conventional imaging and computational imaging, and use computational photography techniques to compensate for various defects in the optical system, thus ultimately breaking through the physical limits in conventional imaging of imaging instruments to achieve the performance and functions that the conventional imaging method cannot achieve.

To sum up, there is an urgent need for a new microscopic imaging method to realize macro-micro combined multi-scale high-resolution observation from cells, tissues, to organs while ensuring a wide field of view.

SUMMARY

The present invention provides a wide-field multi-scale high-resolution microscopic imaging system and method.

Thus, by a design for an objective and an improvement to an imaging method, the dilemma that the existing biomicroscopy system cannot realize high-resolution observation in a large field of view is broken through, thus realizing cross-scale observation that achieves both large-scale macroscopic and high-resolution microscopic requirements.

A wide-field multi-scale high-resolution microscopic imaging system includes a light source, a sample, a microscope imaging objective system, an acquisition system, and a workstation, where the microscope imaging objective system is used for forming an image after a light beam emitted by the light source illuminates the sample, to obtain a wide-field curved image plane;

the acquisition system includes an acquisition lens array for subfield acquisition of the curved image plane, and a camera array for secondary imaging; and the workstation is used for analyzing the acquired image in overlapping fields of view, and performing image splicing based on the fields of view, to finally obtain a wide-field high-resolution image.

A beam splitter assembly and a reflector assembly are disposed between the microscope imaging objective system and the acquisition system, where the beam splitter assembly is formed by a semi-reflective semi-transparent beam splitter and a dichroic mirror, and the reflector assembly is a planar reflector.

The semi-reflective semi-transparent beam splitter and the dichroic mirror each form an included angle of 45° with an optical axis, and they can both be moved by a mechanical rail device.

The acquisition lens array and the camera array are each a curved-surface array consistent with the curved image plane.

The acquisition lens array includes a relay lens array and an image sensor lens assembly array, where the relay lens array is placed along the curved image plane formed by the microscope imaging objective system, and the image sensor lens assembly array performs subfield acquisition for the curved image plane formed by the microscope imaging objective system.

The camera array is used for performing secondary imaging for light arrays that have been subjected to the subfield acquisition.

The present invention further provides a wide-field multi-scale high-resolution microscopic imaging method, including the following steps:

1) illuminating, by a light source, a sample on a sample transfer platform;

2) performing, by a microscope imaging objective system, first imaging for the light, to form a curved image plane;

3) performing, by an acquisition system, subfield acquisition for an intermediate curved image plane, to complete secondary imaging; and 4) transmitting sample image information obtained by a camera to a workstation, for image storage and splicing processing, to finally obtain a wide-field high-resolution microscopic image that provides multi-scale observation data from sub-cells, tissues, to organs.

Preferably, the secondary imaging refers to performing imaging again with the camera after subfield acquisition of the curved image plane formed by the microscope imaging objective system.

Preferably, the acquisition system includes an acquisition lens array for subfield acquisition of the curved image plane, and a camera array for secondary imaging.

Preferably, the acquisition lens array and the camera array are each a curved-surface array consistent with the curved image plane.

The high-resolution wide-field microscope objective is formed by thirteen spherical lenses which are divided into ten lens assemblies, where the ten lens assemblies are a first lens assembly, a second lens assembly, a third lens assembly, a fourth lens assembly, a fifth lens assembly, a sixth lens assembly, a seventh lens assembly, an eighth lens assembly, a ninth lens assembly, and a tenth lens assembly. The first lens assembly to the fifth lens assembly use a structural form combining convex lenses and doublets, so that a front plane of the system is moved forward to obtain a long focal length and a short working distance. The focal power of the first lens assembly is negative. The second lens assembly is a doublet, where the focal power of the first lens is positive, while the focal power of the second lens is negative. The focal power of the third lens assembly is positive. The fourth lens assembly and the fifth lens assembly are both formed by doublets, where the focal power of the first lens in each assembly is negative, while the focal power of the second lens is positive. The sixth lens assembly to the tenth lens assembly use glass with a high Abbe number to correct chromatic aberrations in a wide waveband, thus prolonging a post-working distance of the system. The focal power of the sixth lens assembly is positive, the focal power of the seventh lens assembly is negative, the focal power of the eighth lens assembly is negative, the focal power of the ninth lens assembly is positive, and the focal power of the tenth lens assembly is positive.

DETAILED DESCRIPTION

The following describes the present invention in detail with reference to the accompanying drawings and specific embodiments.

Figure 1:
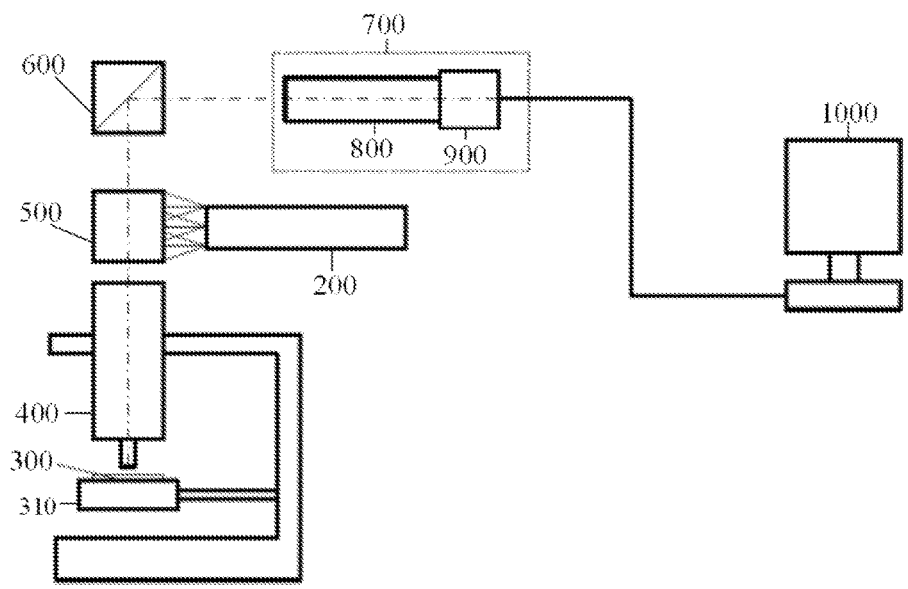
FIG. 1 is an overall schematic structural diagram of a wide-field multi-scale high-resolution microscopic imaging system of the present invention.

FIG. 1 is an overall schematic structural diagram of a wide-field multi-scale high-resolution microscopic imaging system 100 of the present invention, where the system includes an adjustable light source 200, a sample 300, a sample transfer platform 310, a wide-field microscope imaging objective system 400, and a high-resolution acquisition system 700. The microscope imaging objective system 400 includes a beam splitter assembly 500 and a reflector assembly 600. The high-resolution acquisition system 700 includes an acquisition lens array 800 and a camera array 900, to obtain subfield image information, which is used for subsequent digital image processing.

As shown in FIG. 1, the adjustable light source 200 is used to illuminate the sample 300. The high-resolution acquisition system 700 is a curved-surface array of 7×5, which is formed by 35 acquisition lenses and 35 cameras. The acquisition lens array 800 in the acquisition system is used for acquiring subfield images and correct subfield aberrations. The camera array 900 provides the acquired image information for a workstation 1000, and the workstation 1000 performs image splicing for the obtained image information.

Figure 2:
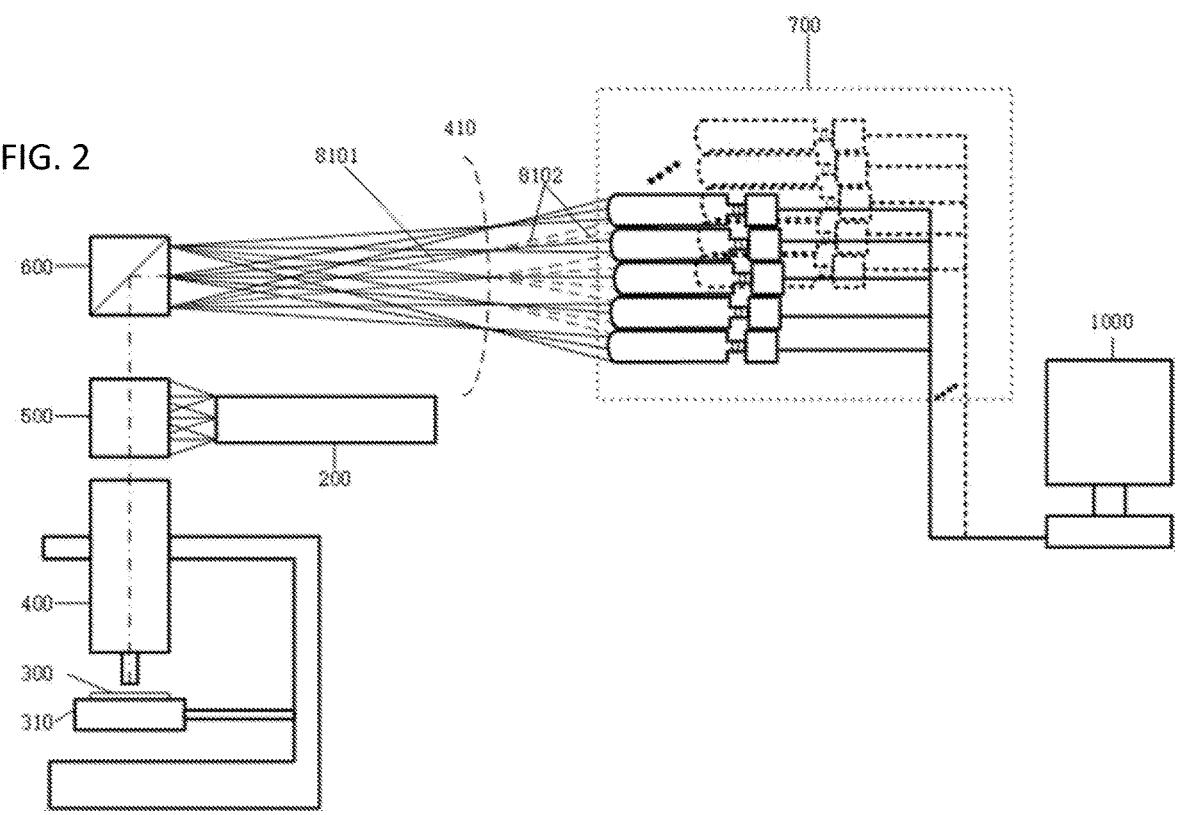
FIG. 2 is a schematic diagram of a structure used in the first step of a wide-field microscopic imaging method of the present invention.

FIG. 2 is a schematic diagram of a structure used in the first step of a wide-field microscopic imaging method of the present invention. As shown in FIG. 2, the curved image plane 410 is formed after the light passes through the wide-field microscope imaging objective system 400, the beam splitter assembly 500 and the reflector assembly 600. As compared with the conventional optical image plane, the curved image plane 410 can more effectively reduce the field curvature aberrations the system, especially the field curvature at edges of the field of view. Thus, the aberrations the whole system can be well controlled. In addition, the curved image plane 410, as an intermediate image plane of the system, is also an object plane of the subfield acquisition system 700. The curved image plane corrects the system aberrations, thus lowering the difficulty in correction of the aberration by the subfield acquisition system 700. As such, the whole performance of the imaging system is improved.

Figure 3:
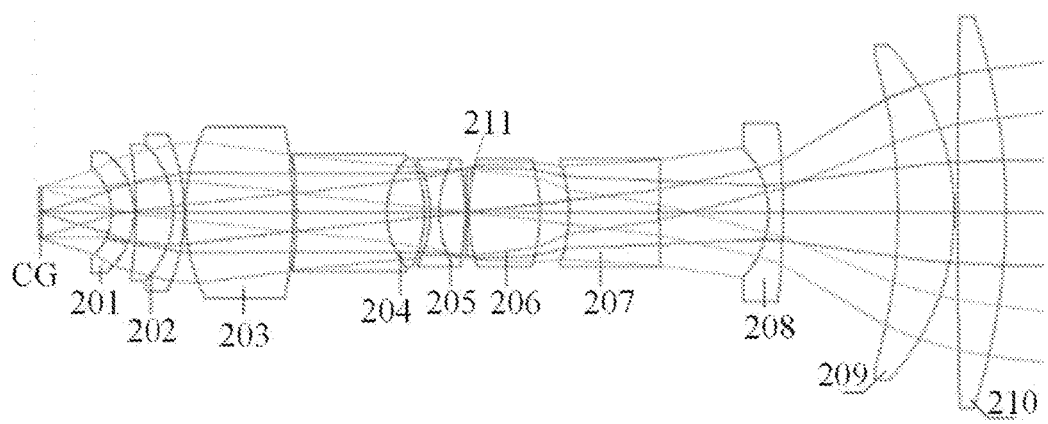
FIG. 3 is an optical system diagram of an imaging objective.

As shown in FIG. 3, the microscope imaging objective system 400 is mainly formed by a first lens assembly 201, a second lens assembly 202, a third lens assembly 203, a fourth lens assembly 204, a fifth lens assembly 205, a sixth lens assembly 206, a seventh lens assembly 207, an eighth lens assembly 208, a ninth lens assembly 209, and a tenth lens assembly 210. These lenses are integrated to correct the aberrations the microscope objective system, so that the performance of the microscope objective system is improved. The second lens assembly 202, the fourth lens assembly 204, and the fifth lens assembly 205 are all formed by doublets. The second lens assembly is a positive-to-negative type, and the fourth lens assembly and the fifth lens assembly are each a negative-to-positive type, so that a long focal length and a short working distance can be conveniently obtained. In addition, the focal powers of the third lens assembly, the sixth lens assembly, the ninth lens assembly, and the tenth lens assembly are all positive, while the focal powers of the first lens assembly, the seventh lens assembly, the eighth lens assembly are all negative. The diaphragm 211 is located 0.5 mm before the sixth lens assembly. The eighth lens assembly uses a material with a high Abbe dispersion coefficient to correct chromatic aberrations in a wide waveband, so that the microscope objective system can clearly form an image within a wavelength ranging from 460 nm to 650 nm.

Table 1 shows a design result for the microscope objective 200, where the result includes specific parameters of each lens assembly.

TABLE 1

| Microscope objective system | | | |
|---|---|---|---|
| s | r | d | nd |
| 1 | ∞ | 0.7 | 1.516798 |
| 2 | ∞ | 19.462 | |
| 3 | −17.039 | 6.3 | 1.846663 |
| 4 | −21.8 | 0.5 | |
| 5 | −114.485 | 10.5 | 1.846663 |
| 6 | −26.890 | 3.1 | 1.746931 |
| 7 | −52.986 | 0.3 | |
| 8 | 55.534 | 29.9 | 1.846663 |
| 9 | −122 | 1 | |
| 10 | −89 | 25 | 1.805181 |
| 11 | 24.21 | 10.4 | 1.656913 |
| 12 | −36.85 | 1.57 | |
| 13 | −32.214 | 2.5 | 1.805181 |
| 14 | 30.2 | 7.3 | 1.656913 |
| 15 | −89.77 | 0.5 | |
| 16 | ∞ | 0.5 | |
| 17 | 44.253 | 19.8 | 1.671024 |
| 18 | −50.35 | 8.12 | |
| 19 | −38.680 | 25 | 1.612934 |
| 20 | 336.84 | 30.5 | |
| 21 | −26.42 | 4 | 1.746931 |
| 22 | −222.59 | 31.92 | |
| 23 | −150.714 | 15.6 | 1.739999 |
| 24 | −69.98 | 1 | |
| 25 | 3200 | 13.25 | 1.671024 |
| 26 | −174.5 | 110 | |
| 27 | ∞ | 7 | 1.458464 |
| 28 | ∞ | 200 | |
| 29 | ∞ | 1400 | Mirror |
| 30 | 2016.62 | | |

Figure 4:
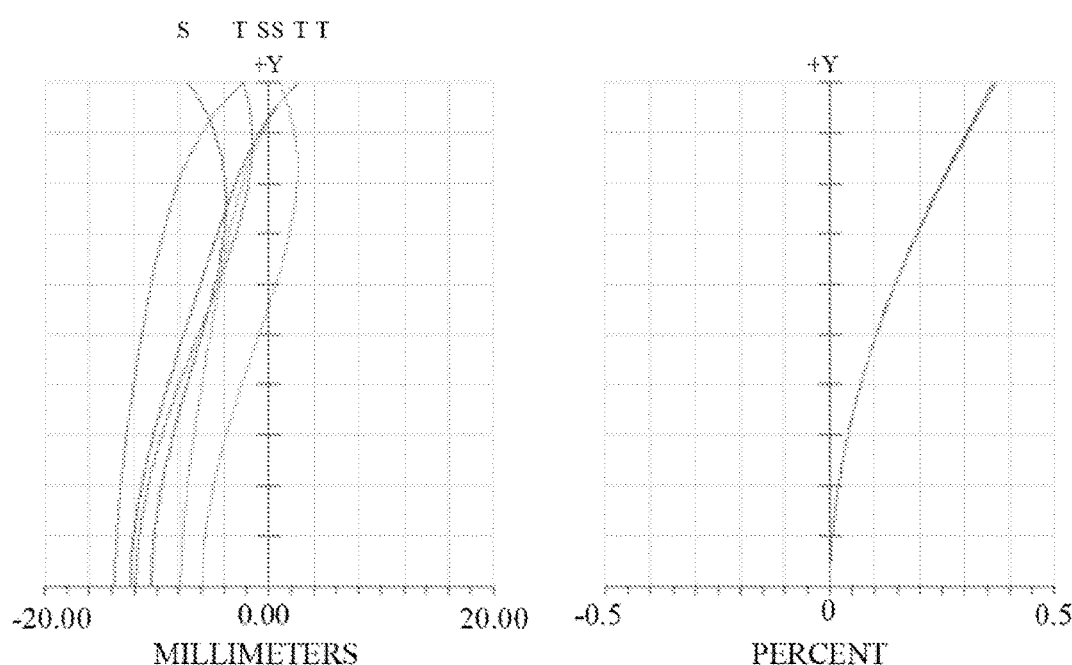
FIG. 4 is a chart of curves showing field curvature and distortion of a microscope objective.

FIG. 4 shows field curvature and distortion of an optical system of a microscope objective of the present invention. It can be seen from FIG. 4 that, the maximum optical distortion of the whole system is less than 0.4%.

Figure 5:
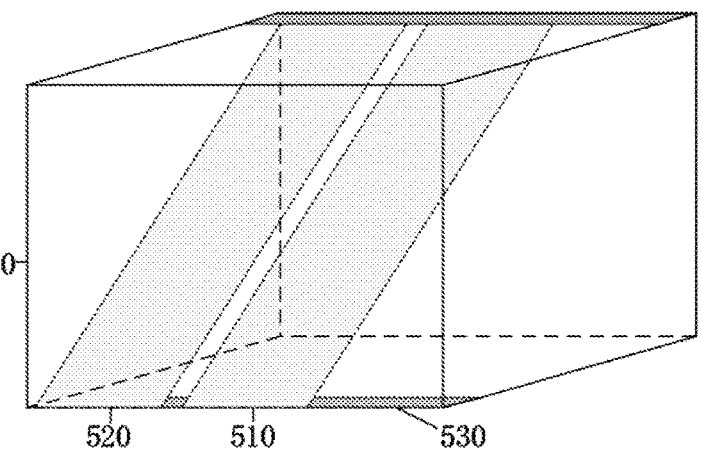
FIG. 5 is a schematic structural diagram of the inside of a beam splitter assembly of the present invention.

FIG. 5 is a schematic structural diagram of the inside of a beam splitter assembly of the present invention. As shown in FIG. 5, the beam splitter assembly 500 is formed by a semi-reflective semi-transparent lens 510 and a beam splitter 520. Through observation of an ordinary sample, the semi-reflective semi-transparent lens 510 can be used to reduce the intensity of the light emitted by the light source 200, so as to achieve an optimum observation effect. Through observation of a fluorescent sample, the beam splitter 520 is used to reflect excitation light and make fluorescence to pass through. Herein, green light with the wavelength of 555 nm is selected to pass through it. The semi-reflective semi-transparent lens 510 and the beam splitter 520 each form an included angle of 45° with an optical axis, and they can both be moved by a mechanical rail device 530.

Figure 6:
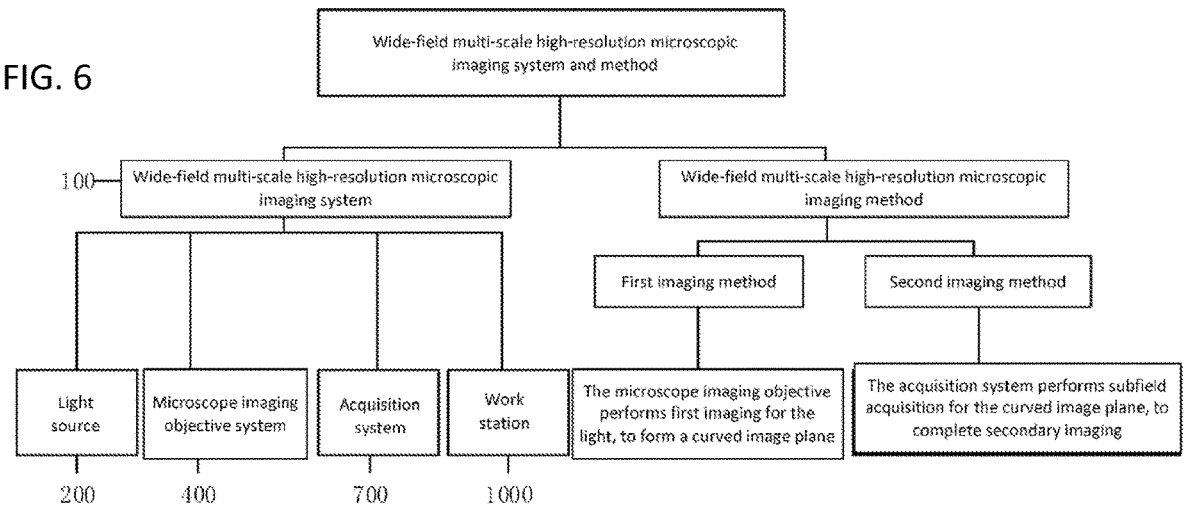
FIG. 6 is an overall flowchart of a wide-field multi-scale high-resolution microscopic imaging method of the present invention.

FIG. 6 is an overall flowchart of a wide-field high-resolution microscopic imaging method of the present invention. The image acquisition method includes the following steps:

1) The adjustable light source 200 illuminates a sample 300 on a sample transfer platform 310.

2) The microscope imaging objective system 400 performs first imaging for the light, to form a curved image plane 410.

3) The acquisition system 700 performs subfield acquisition for the curved image plane 410, to complete secondary imaging.

4) The sample image information acquired by the camera 900 is transmitted to the workstation 1000, for image storage and splicing processing, to finally obtain a wide-field high-resolution microscopic image.

In this embodiment, in step 1), the sample 300 may be an ordinary material or a fluorescent sample, where the light source 200 and the beam splitter 520 may be used to excite fluorescence from the fluorescent sample.

In step 2), the wide-field image may be obtained by using the imaging objective system 400. The reflector assembly 600 and the optical axis form an included angle of 45°, to split light and change a manner of emergent light, so that a light path after the reflection is perpendicular to that before the reflection.

In step 3), the acquisition system 700 includes an acquisition lens array 800 and a camera array 900. After the acquisition lens array 800 completes subfield acquisition, the camera array 900 transmits image information in corresponding subfields to the workstation 1000. Thus, the workstation 1000 can perform analysis and splicing processing for the images.

Figure 7A:
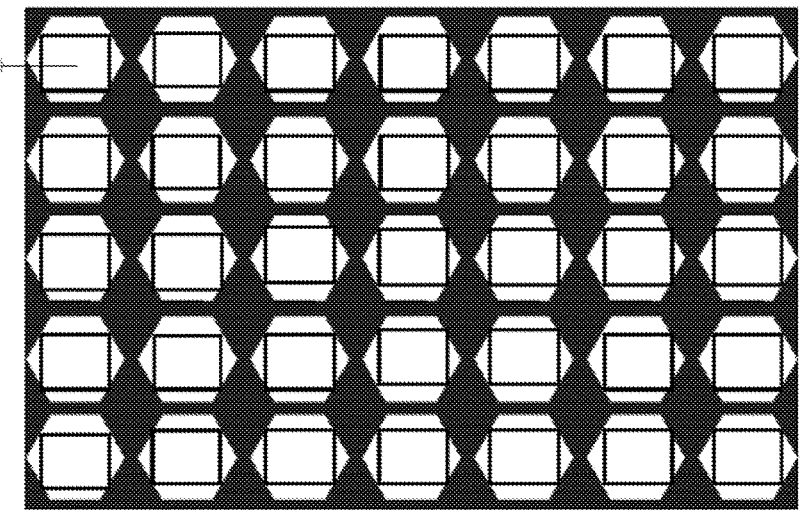
FIG. 7A is a schematic diagram showing an array arrangement of an acquisition system of the present invention.
Figure 7B:
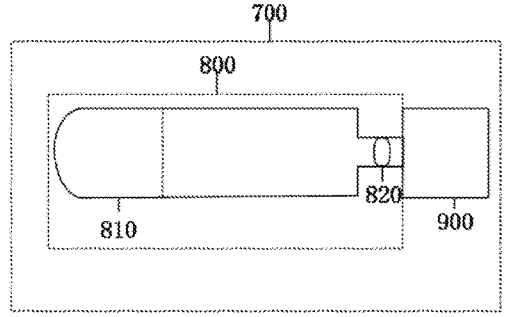
FIG. 7B is a schematic diagram of an acquisition system used in the second step of a multi-scale high-resolution microscopic imaging method of the present invention.

FIG. 7A is a schematic diagram showing an array arrangement of an acquisition system 700 of the present invention. FIG. 7B is a schematic diagram of an acquisition system used in the second step of a high-resolution microscopic imaging method of the present invention. The high-resolution acquisition system 700 is a curved-surface array of 7×5, which is formed by 35 acquisition lenses and 35 cameras. The curvature of the curved-surface array is consistent with that of the intermediate image plane 410 formed by the microscope imaging objective system 400. The arrangement of the curved-surface array is further consistent with that of an array 410 formed by the 35 acquisition lenses. The acquisition lens includes a relay lens 810 and an image sensor lens assembly 820. The relay lens 810 is a front lens of the acquisition lens. Each relay lens is placed along the curvature of the intermediate image plane 410 formed by the microscope imaging objective system 400; and is used to lower the height of marginal light, thus solving the problem of matching between an optical pupil and primary light in the system. Moreover, the relay lens 810 does not make any contribution to the focal power of the whole imaging system, and therefore, may not affect the on-axis light beam and system magnification.

As shown in FIG. 7, in the acquisition system 700, the acquisition lens array 800 and the camera array 900 separately take charge of partially imaging and correction of aberrations, thus enhancing the degree of freedom. The fields of view 8101 between adjacent image sensor lens assemblies 820 have an overlapping area, which is used for subsequent image splicing by the workstation 1000. Thus, after two-step imaging is completed by using 35 image sensor lens assemblies 820, a pixel of the whole image represents a sum of pixels of all the cameras in the camera array 900, so that the resolution of the whole system 100 is enhanced to a micron grade.

The material of the first lens assembly is H-ZF52A, the radius of the front surface is −17.039 mm, the radius of the rear surface is −21.8 mm, and the thickness is 6.3 mm. The second lens assembly is formed by cementing two lenses of which the materials are respectively H-ZF52A and H-LAK3, where the radius of the front surface of the first lens is −114.485 mm, the radius of the rear surface is −26.89 mm, and the thickness thereof is 10.5 mm; the radius of the rear surface of the second lens is −52.986 mm and the thickness thereof is 3.1 mm. The material of the third lens assembly is H-ZF52A, the radius of the front surface is 55.534 mm, the radius of the rear surface is −122 mm, and the thickness is 29.9 mm. The fourth lens assembly and the fifth lens assembly are each a doublet assembly, and the materials of the two lenses both are H-ZF7LA and H-ZBAF3, where the radius of the front surface of the first lens of the fourth lens assembly is −89.2 mm, the radius of the rear surface is 24.21 mm, and the thickness thereof is 25 mm; the radius of the rear surface of the second lens is −36.85 mm and the thickness thereof is 10.4 mm. The radius of the front surface of the first lens of the fifth lens assembly is −32.214 mm, the radius of the rear surface is 30.2 mm, and the thickness thereof is 2.5 mm; the radius of the rear surface of the second lens is −89.77 mm and the thickness thereof is 7.3 mm. The material of the sixth lens assembly is H-ZBAF5, the radius of the front surface is 44.253 mm, the radius of the rear surface is −50.35 mm, and the thickness of the lens is 19.8 mm. The material of the seventh lens assembly is H-F2, the radius of the front surface is −38.68 mm, the radius of the rear surface is 336.84 mm, and the thickness is 25 mm. The material of the eighth lens assembly is H-LAK3, the radius of the front surface is −26.42 mm, the radius of the rear surface is 222.59 mm, and the thickness is 4 mm. The material of the ninth lens assembly is ZF5, the radius of the front surface is −150.714 mm, the radius of the rear surface is −69.98 mm, and the thickness is 15.6 mm. The material of the tenth lens assembly is H-ZBAF5, the radius of the front surface is 3200 mm, the radius of the rear surface is −174.5 mm, and the thickness is 13.25 mm.

The microscope objective further includes an aperture, which is located 0.5 mm before the sixth lens assembly.

In the imaging method of the present invention, the two steps thereof both use relevant lens assemblies. In the first step of the microscopic imaging method, first imaging is performed by an imaging objective for the light after a sample is illuminated by a light source, to form a curved image plane. The microscope imaging objective system is formed by thirteen spherical lenses which are divided into ten lens assemblies, and used to correct system aberrations and achieve a wide field of view. In the second step of the microscopic imaging method, an acquisition lens array and a camera array are used to acquire the intermediate curved image plane formed by the microscope imaging objective system. The acquisition lens array is formed by five lens assemblies each having seven spherical lenses; and used to acquire, in corresponding subfields, the intermediate curved image plane formed by the microscope objective. The intermediate curved image plane corresponds to the position of a field lens in the acquisition lens array. Herein, the field lens solves the problem of matching between primary rays in the microscope imaging objective system and the acquisition lens system. The camera transmits acquired image information to the workstation, for image splicing based on adjacent overlapping fields of view 8102. By the two-step imaging method, a wide-field multi-scale high-resolution microscopic image can be obtained.

Although the existing CCD imaging technology can observe a sample in a wide field of view, it still lacks the ability to reflect the details of the microstructure of the cells. On the other hand, most confocal microscopes guarantee resolution at the expense of a wide field of view. Moreover, more and more pathologists need to use the microscopy to realize multi-scale observation from sub-cells, tissues, to organs. Therefore, it is of great significance to use the above-mentioned imaging system and method to obtain a multi-scale high-resolution image while achieving a wide field of view.

The microscope imaging objective system is formed by thirteen spherical lenses which are divided into ten lens assemblies, which has a full spherical lens structure and subtle arrangement, and is easily processed as compared with an aspherical lens. In the microscope imaging objective system, three assemblies of doublets and four lenses made by using a high-refraction material are used to correct the chromatic aberrations of the system, to finally obtain a centimeter-sized wide field of view of 1 cm×1 cm. An image plane formed by the microscope imaging objective system is a curved surface. The curved image plane can effectively reduce the field curvature of the system as compared with a conventional planar image plane, thus well controlling the aberrations the whole system. In addition, the curved image plane, as an intermediate image plane formed through secondary imaging, breaks the constraint of the physical boundaries of an existing photoelectric imaging system, and effectively reduces the field curvature aberration at the edges of the wide field of view. Moreover, the difficulty in correcting the field curvature aberration by the subfield acquisition lens in the acquisition system is lowered, thus improving the imaging quality of the whole system.

Two lens assemblies respectively used for beam splitting and light reflection are disposed between the imaging objective system and the acquisition system, where the first lens assembly for beam splitting is formed by a semi-reflective semi-transparent beam splitter and a dichroic mirror. The two lenses may be horizontally moved by a mechanical device, and then one of the two pieces of glass may be selected for experimental observation. The semi-reflective semi-transparent beam splitter reflects away part of the light emitted by the light source. The remaining part enters the microscopic system to provide appropriate illumination brightness for the observed sample. The dichroic mirror is used for color-light separation during observation of a fluorescent sample. The dichroic mirror is highly reflective for the light with an excitation light wavelength, while is highly transmissible for the light within a fluorescence wavelength emitted by the sample. That is, the dichroic mirror is able to reflect the excitation light and make fluorescence to pass through. Herein, green light with the wavelength of 555 nm is selected to pass through it. The second lens assembly is a planar reflector that hardly results in any aberration, thus ensuring clear imaging of the microscope objective system.

The acquisition system includes an acquisition lens array and a camera array. The acquisition lens includes a thick field lens and several lens assemblies. The field lens is used to solve the problem of matching between the primary ray of the imaging objective system and the acquisition lens, and further to weaken a vignetting effect. The latter several small lens assemblies are used to perform subfield acquisition for the curved image plane and correct the aberrations in the respective subfields, so that each small lens assembly is highly flexible in correction of system aberrations. The camera array delivers the acquired image information to the workstation for image splicing. The acquisition lens array and the camera array that are described herein form a curved-surface array of 7×5, where the curvature thereof is consistent with that of the curved image formed by the microscope imaging objective system. The field lens is located at the forefront of the acquisition lens, and the several small lens assemblies are located at the rear portion of the acquisition lens. A pixel of a wide-field multi-scale high-resolution image finally obtained by splicing technique represents a sum of pixels of all the cameras in the array, thus greatly enhancing the image resolution while ensuring effective observation in a large field of view.

The above merely describes preferred embodiments of the present invention, but is not intended to limit the present invention. Any modifications, equivalent replacements or improvements made within the spirit and principle of the present invention shall fall within the protection scope of the present invention.

What is claimed is:

1. A wide-field multi-scale high-resolution microscopic imaging system, comprising a light source, a sample, a microscope imaging objective system, an acquisition system, and a workstation, wherein the microscope imaging objective system is used for forming an image after a light beam emitted by the light source illuminates the sample, to obtain a wide-field curved image plane;

the acquisition system includes an acquisition lens array comprising 35 acquisition lenses for subfield acquisition of the curved image plane, and a camera array comprising 35 cameras for performing secondary imaging for light arrays that have been subjected to the subfield acquisition; the acquisition system is a curved-surface array of 7×5, which is formed by the 35 acquisition lenses and the 35 cameras; a curvature of the curved-surface array is equal to that of the wide-field curved image plane; and the workstation is used for analyzing an acquired image in overlapping fields of view, and performing image splicing based on the fields of view, to finally obtain a wide-field multi-scale high-resolution image;

a beam splitter assembly and a reflector assembly are disposed between the microscope imaging objective system and the acquisition system, the beam splitter assembly is formed by a semi-reflective semi-transparent beam splitter and a dichroic mirror, and the reflector assembly is a planar reflector;

the microscope imaging objective system is formed by thirteen spherical lenses which are divided into ten lens assemblies, where the ten lens assemblies are a first lens assembly, a second lens assembly, a third lens assembly, a fourth lens assembly, a fifth lens assembly, a sixth lens assembly, a seventh lens assembly, an eighth lens assembly, a ninth lens assembly, and a tenth lens assembly, a set of the first lens assembly to the fifth lens assembly uses a structural form including convex lenses and doublets, so that a front plane of the system is moved forward to obtain a long focal length and a short working distance, a focal power of the first lens assembly is negative, the second lens assembly is a doublet, where a focal power of a first lens is positive, while a focal power of a second lens is negative, a focal power of the third lens assembly is positive, the fourth lens assembly and the fifth lens assembly are both formed by doublets, where a focal power of a first lens in each assembly is negative, while a focal power of a second lens is positive, a set of the sixth lens assembly to the tenth lens assembly uses glass with a high Abbe number to correct chromatic aberrations in a wide waveband, thus prolonging a post-working distance of the system, a focal power of the sixth lens assembly is positive, a focal power of the seventh lens assembly is negative, a focal power of the eighth lens assembly is negative, a focal power of the ninth lens assembly is positive, and a focal power of the tenth lens assembly is positive, a diaphragm is located 0.5 mm before the sixth lens assembly, the eighth lens assembly uses glass with a high Abbe dispersion coefficient to correct chromatic aberrations in a wide waveband.

2. The wide-field multi-scale high-resolution microscopic imaging system of claim 1, wherein the semi-reflective semi-transparent beam splitter and the dichroic mirror each form an included angle of 45° with an optical axis of the microscope imaging objective system, and they can both be moved via a rail.

3. The wide-field multi-scale high-resolution microscopic imaging system of claim 1, wherein the acquisition lens array comprises a relay lens array and an image sensor lens assembly array, the relay lens array is placed along the curved image plane formed by the microscope imaging objective microscope imaging objective system, and the image sensor lens assembly array performs subfield acquisition for the curved image plane formed by the microscope imaging objective microscope imaging objective system.

4. A wide-field multi-scale high-resolution microscopic imaging method, comprising the following steps:

1) illuminating, by a light source, a sample on a sample transfer platform;

2) performing, by a microscope imaging objective system, first imaging for light, to form an intermediate curved image plane; wherein the microscope imaging objective system is formed by thirteen spherical lenses which are divided into ten lens assemblies, where the ten lens assemblies are a first lens assembly, a second lens assembly, a third lens assembly, a fourth lens assembly, a fifth lens assembly, a sixth lens assembly, a seventh lens assembly, an eighth lens assembly, a ninth lens assembly, and a tenth lens assembly, a set of the first lens assembly to the fifth lens assembly uses a structural form including convex lenses and doublets, so that a front plane of the system is moved forward to obtain a long focal length and a short working distance, a focal power of the first lens assembly is negative, the second lens assembly is a doublet, where a focal power of a first lens is positive, while a focal power of a second lens is negative, a focal power of the third lens assembly is positive, the fourth lens assembly and the fifth lens assembly are both formed by doublets, where a focal power of a first lens in each assembly is negative, while a focal power of a second lens is positive, a set of the sixth lens assembly to the tenth lens assembly uses glass with a high Abbe number to correct chromatic aberrations in a wide waveband, thus prolonging a post-working distance of the system, a focal power of the sixth lens assembly is positive, a focal power of the seventh lens assembly is negative, a focal power of the eighth lens assembly is negative, a focal power of the ninth lens assembly is positive, and a focal power of the tenth lens assembly is positive, a diaphragm is located 0.5 mm before the sixth lens assembly, the eighth lens assembly uses glass with a high Abbe dispersion coefficient to correct chromatic aberrations in a wide waveband;

3) performing, by an acquisition system, subfield acquisition for the intermediate curved image plane, to complete secondary imaging; wherein the acquisition system comprises an acquisition lens array comprising 35 acquisition lenses for subfield acquisition of the intermediate curved image plane, and a camera array comprising 35 cameras for performing secondary imaging for light arrays that have been subjected to the subfield acquisition; the acquisition system is a curved-surface array of 7×5, which is formed by the 35 acquisition lenses and the 35 cameras; a curvature of the curved-surface array is equal to that of the intermediate curved image plane; and 4) transmitting sample image information obtained by a camera to a workstation for image storage and splicing processing, to finally obtain a wide-field high-resolution microscopic image.

5. The wide-field multi-scale high-resolution microscopic imaging method of claim 4, wherein the secondary imaging refers to performing imaging again with the camera after the subfield acquisition of the intermediate curved image plane formed by the microscope imaging objective system.

* * * * *